United States Patent
Fogel

[19]

[11] Patent Number: 5,914,987
[45] Date of Patent: Jun. 22, 1999

[54] METHOD OF RECOVERING SYMBOLS OF A DIGITALLY MODULATED RADIO SIGNAL

[75] Inventor: Eliezer Fogel, Benyehuda, Israel

[73] Assignee: Motorola, Inc., Schaumburg, Ill.

[21] Appl. No.: 08/671,031

[22] Filed: Jun. 27, 1996

[30] Foreign Application Priority Data

Jun. 27, 1996 [IL] Israel ........................................ 9513086

[51] Int. Cl.$^6$ .............................. H03D 1/00; H03K 9/00; G06F 17/10
[52] U.S. Cl. .......................... 375/340; 375/342; 329/311; 329/312; 364/724.11; 364/724.01
[58] Field of Search ..................... 375/340, 342, 375/343; 329/311, 312, 346; 364/724.11, 724.03, 724.2, 725.01, 726.02, 726.03

[56] References Cited

U.S. PATENT DOCUMENTS

| | | | |
|---|---|---|---|
| 3,864,632 | 2/1975 | Chang ....................................... | 375/230 |
| 5,285,474 | 2/1994 | Chow et al. ............................. | 375/222 |
| 5,596,607 | 2/1997 | Larsson et al. ......................... | 375/340 |
| 5,627,863 | 5/1997 | Aslanis et al. ......................... | 375/357 |

FOREIGN PATENT DOCUMENTS

0 096 802  12/1983  European Pat. Off. .

Primary Examiner—Chi H. Pham
Assistant Examiner—Khai Tran
Attorney, Agent, or Firm—Christopher P. Moreno

[57] ABSTRACT

A method of recovering a finite duration of N symbols of a digitally-modulated signal, wherein a received signal is sampled at a period $T_1$, generating a batch of $K_1$ samples, wherein $K_1$ is chosen to be an integer multiple of the N symbols. The $K_1$ time-domain samples are input to a discrete fourier transform (20) providing a first batch of $K_1$ frequency-domain samples. The first batch of $K_1$ frequency-domain samples are multiplied by a set of frequency-domain $K_1$ complex gains to provide a second batch of $K_1$ frequency-domain samples. The second batch of $K_1$ frequency-domain samples are broken into $K_1/N$ batches of N samples. The $K_1/N$ batches are added, generating a single batch of N samples which is input to an inverse fast fourier transform (24) to obtain N time-domain samples.

7 Claims, 3 Drawing Sheets

−PRIOR ART−

METHOD OF RECOVERING SYMBOLS OF A DIGITALLY MODULATED RADIO SIGNAL

FIELD OF THE INVENTION

This invention relates to a method of recovering symbols of a digitally modulated radio signal.

BACKGROUND OF THE INVENTION

In digital communications systems using Time Division Multiple Access (TDMA) schemes, to apportion the available spectrum to the communication users, digital receivers are typically designed for operation in the time-domain to recover the digitally transmitted information. As the technology used in such digital communications systems has increased in complexity, the requirement on the computational capabilities of digital radios has increased. Consequently, there is an increasing need for more optimal use of the digital signal processing resource within digital radios.

In a TDMA system data recovery is generally carried out in the time-domain for a whole slot of data using, for example, a Viterbi decoder. The traditional approach to the implementation of an optimal digital receiver uses a matched filter followed by a (infinite optimal or finite sub-optimal) tap delay equaliser operating in the time-domain. The matched filter at the receiver corresponds to the transmit filter of the digital transmitter. In digital systems the transmitted data symbols are convolved with the transmit filter impulse response (g(t)) to provide the transmitted signal, s(t)=g(t)* data. This transmitted signal needs to be demodulated and the original data symbols recovered at the digital receiver.

A time-domain implementation typically uses an equaliser to compensate for any inter-symbol interference (ISI) of the received symbols that has been caused within the channel. This is not necessarily an optimal solution. Moreover, having a complex channel impulse (in the sense of real and imaginary parts), requires a complex finite impulse response (FIR) filter for equalisation purposes, making the solution even more computationally expensive.

Typically, such operations are computationally complex, requiring a significant amount of the signal processing resource of a digital radio. Additionally, in order to accommodate the use of time-domain equalisers, effort is directed at achieving a Nyquist pulse shape response for the transmitted and received symbols.

Thus there is a need for an improved method of recovering symbols of a digitally modulated radio signal which avoids some of the disadvantages of prior art arrangements.

SUMMARY OF THE INVENTION

In a first aspect of the present invention, a method of recovering a finite duration of N symbols of a finite duration digitally-modulated received radio signal is provided. The method includes the steps of receiving a signal and sampling the signal at a sampling period $T_1$ to generate a batch of $K_1$ time-domain samples, wherein the sampling frequency is a multiple of the symbol frequency. The batch of $K_1$ time-domain samples are transformed to the frequency-domain to provide a first batch of $K_1$ frequency-domain samples. The first batch of $K_1$ frequency-domain samples are multiplied by a set of frequency-domain $K_1$ complex gains ($a_i$: i=1 to $K_1$), to provide a second batch of $K_1$ frequency-domain samples. The second batch of $K_1$ frequency-domain samples is broken into $K_1/N$ batches of N samples which are added to each other to generate a single batch of N samples. The single batch of N samples is inverse transformed to obtain N time-domain samples which are the desired transmitted symbols.

In this manner, a batch of ($K_1$) digitally-modulated received time-domain samples, wherein $K_1$ is chosen to be a multiple of the number of symbols N and the sampling frequency is a multiple of the symbol frequency of the received signal, are transformed into the frequency-domain, processed and inverse transformed back into the time-domain to recover the desired symbols.

In a second aspect of the present invention, a method of recovering a finite duration of N symbols of a finite duration digitally-modulated received radio signal is provided. The method includes the steps of receiving a signal and sampling the signal at a sampling period $T_1$ to generate a batch of $K_1$ time-domain samples, wherein the sampling frequency is not a multiple of the symbol frequency. The batch of $K_1$ time-domain samples are transformed to the frequency-domain to provide a batch of $K_1$ frequency-domain samples. Zeros are appended to the $K_1$ frequency-domain batch of samples to provide a batch of $K_2$ samples in the frequency-domain where $K_2 > K_1$. The batch of $K_2$ frequency-domain samples are multiplied by a set of frequency-domain $K_2$ complex gains ($a_i$: i=1 to $K_2$), to provide a batch of $K_2$ frequency-domain samples. The batch of $K_2$ frequency-domain samples is broken into $K_2/N$ batches of N samples which are added to each other to generate a single batch of N samples. The single batch of N samples is inverse transformed to obtain N time-domain samples which are the desired transmitted symbols.

In this manner, a batch of digitally-modulated received time-domain samples, wherein the sampling frequency is not a multiple of the symbol frequency, can be recovered by transforming the batch into the frequency-domain, processing the frequency-domain samples and inverse transforming the batch back into the time-domain to recover the desired received time-domain symbols. $K_2$ is assumed to be greater than $K_1$ with the $K_1$ frequency-domain samples are padded by ($K_2 - K_1$) zeros. The zero padded frequency domain samples correspond to the sampling rate of the received signal which is a multiplicative of N, the number of symbols.

In a preferred embodiment of the present invention, the $K_2$ complex gains ($a_i$: i=1 to $K_2$), are calculated by evaluating the receiver pulse shape filter response $g_i$ in the frequency-domain to obtain the batch of $K_2$ complex values ($g_i$: i=1 to $K_2$). Further, the complex gains $g_i$ ($g_i$: i=1 to $K_2$) are normalised by breaking the batch of $K_2$ complex gains $g_i$ into $K_2/N$ batches of N samples ($g_{ij}$: i=1 to N, j=1 to $K_2/N$) and adding the absolute squares of the $K_2/N$ batches to each other to generate a single batch of N normalising values ($q_i$: i=1 to N) such that $q_i = \text{sum}[|g_{ij}|^2: j=1 \text{ to } K_2/N]$. Constants $e_i$ may be added to each $q_i$ to allow the introduction of arbitrary design parameters into the frequency-domain receiver design process. Normalising ($g_{ij}$: i=1 to N) of each j is then performed by dividing the values $g_{ij}$ by the values $q_i$ to obtain a new set of gains ($a_{ij} = g_{ij}/q_i$: i=1 to N, j=1 to $K_2/N$). The $K_2/N$ subgroups ($a_{ij}$) are then combined back into a single group to be used as the ($a_i$) complex gains.

In this manner, the computational complexity of calculating the inverse transform of the batch of frequency-domain samples is greatly simplified.

The receiver pulse shape filter response $g_i$ may be pre-stored, or alternatively the parameters $a_i$ may be pre-calculated and pre-stored if the channel characteristics are known apriori.

A preferred embodiment of the invention will now be described, by way of example only, with reference to the drawings.

DETAILED DESCRIPTION OF THE DRAWINGS

Figure 1:
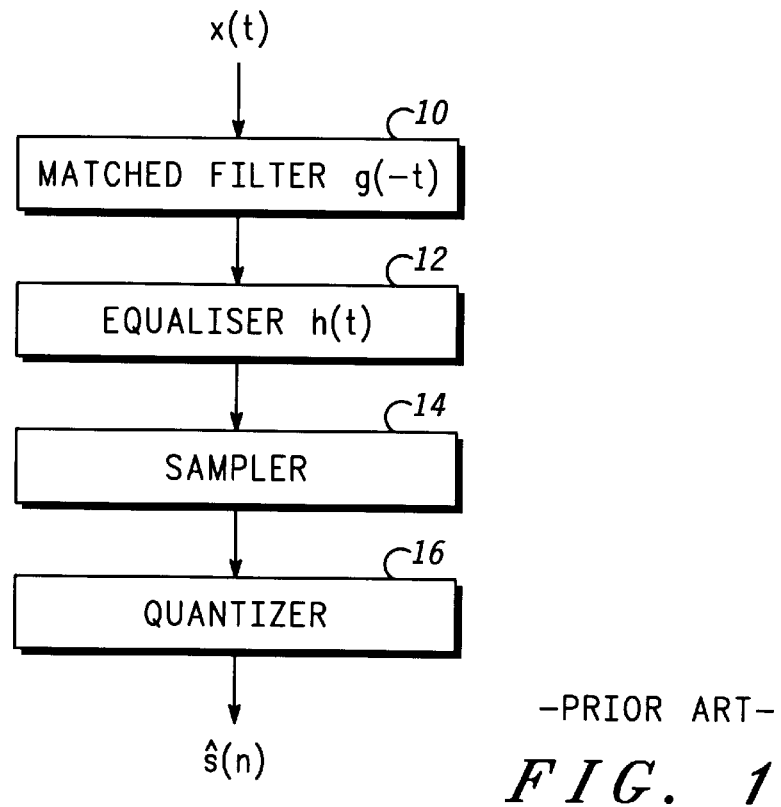
FIG. 1 is a block diagram of the signal processing functions of a prior art digital radio receiver.

Referring first to FIG. 1, a block diagram of the signal processing functions of a prior art digital radio receiver is shown. The signal processing functions comprise a receiver matched filter g(−t) 10, an equaliser h(t) 12, a sampler 14 and a quantizer 16.

In operation, the digital receiver receives a time-domain signal x(t) which is input to a matched filter g(−t) 10. The matched filter in the receiver is a time reversed replica of the pulse shape filter in the transmitter. Implementing a matched filter 10 in the receiver ensures that the combination of both filters gives the desired overall pulse shape response. The filtered pulse is then input to an equaliser h(t) 12 to remove the channel effects of inter-symbol interference (ISI). In a practical time-domain receiver, and given a realistic received pulse, ISI is introduced in the hardware filtering and channel filtering. If the equaliser 12 is a linear equaliser the equaliser operation may be performed before the matched filter 10. The ISI-free received pulse is then input into a sampler 14 to sample the signal at a sampling period T, generating a batch of N time-domain samples. The batch of time-domain samples is then input into a quantizer 16 to obtain the desired symbols.

Specifically, consider the case of a finite duration signal i.e. a time slot in the TDMA context, consisting of N symbols s(n): n=0 . . . N−1 and let the noise free received signal be:

$$x(t) = \sum_{n=0}^{N-1} s(n)g(t-nT) \quad [1]$$

where s(n) is the n-th symbol g(t) is the pulse shape

T is the symbol period then the optimal detected symbol is expressed as $$\hat{s}(n) = Q\left[\sum_i c_i [g((n-iq)T - t) * x(t)]\right] \quad [2]$$

Where * is the convolution operator,

Q[ ] is "quantization" into the symbols alpha-bet, and $q \leq 1$ $c_i$ are the equalizer coefficients The choice of the coefficients $\{c_i\}$ depends on the optimisation criterion. q<1 corresponds to a fractionally spaced equalizer (FSE) chosen so that 1/(qT) is greater than the signal bandwidth, as known to those skilled in the art. The number of coefficients $\{c_i\}$ and their domain (real or complex) depend on the channel characteristics.

In equations [1] & [2] time (t) may be interpreted as a continuous variable or as an integer if x(t) is a sampled signal. In the present context, t is considered an integer. The physical implication is that x(t) is the t-th sample of a continuous signal, sampled at an appropriate sampling rate $1/T_1$. Note that T in general, for a sampled signal, is not necessarily an integer, i.e. $T_1/T$ is not necessarily an integer. This has important ramifications in the practical implementation of the receiver described herein.

The prior art for digital receiver implementation is summarised in equation [2]. For practical channels, the receiver in equation [2] requires time, phase and frequency synchronisation, in addition to the convolution and equalization operation of equation [2].

In typical time-domain digital receivers, where the time-domain symbols are processed sequentially, the signal processing needed to implement the equaliser and matched filter operations is complex and computationally intensive.

Figure 2:
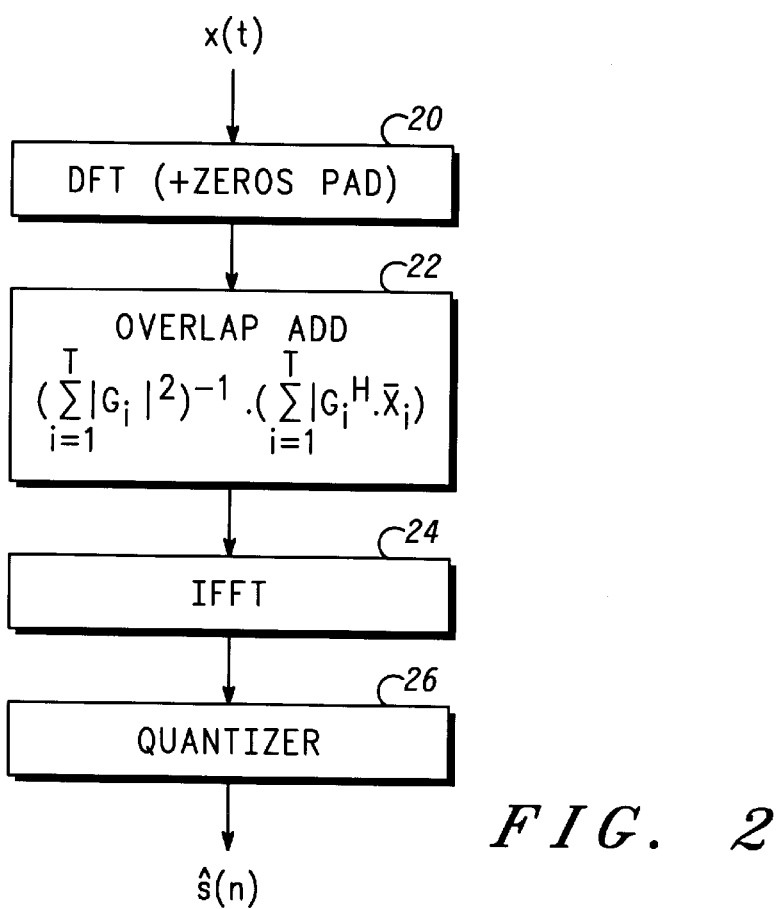
FIG. 2 is a block diagram of a frequency-domain digital radio receiver in accordance with a preferred embodiment of the invention.

Referring now to FIG. 2, a block diagram of a frequency-domain digital radio receiver, in accordance with a preferred embodiment of the invention, is shown. The signal processing functions comprise a discrete fourier transform (DFT) 20 with optional zero padding, an overlap add function 22, an inverse fast fourier transform (IFFT) 24 and a quantizer 26.

In operation, the digital frequency-domain receiver receives a time-domain batch of $K_1$ samples x(t) which are input to the DFT 20. The DFT 20 transforms the batch of $K_1$ time-domain samples into the frequency-domain to provide a batch of $K_1$ frequency-domain samples. The appending of zeros to the $K_1$ frequency-domain samples can be implemented at this stage to provide $K_2$ frequency-domain samples if the sampling frequency 1/T is not an integer multiple of the symbol frequency $1/T_1$, e.g. $T/T_1$ is an integer. If the sampling frequency is an integer multiple of the symbol frequency, $K_1=K_2$. The received samples in the frequency-domain are then input to an overlap add function 22. The overlap add function 22 multiplies the batch of $K_2$ frequency-domain samples by a set of $K_2$ complex gains ($a_i$: i=1 to $K_2$), to provide a batch of $K_2$ frequency-domain samples. The batch of $K_2$ frequency-domain samples are then broken into $K_2/N$ batches of N samples which are added to each other to generate a single batch of N samples. The frequency-domain signal is then input to an IFFT 24 to transform the single batch of N samples back into the time-domain to obtain N samples. The N samples are then input into a quantizer 26 to obtain the "symbols" output of the received signal ŝ(n).

Figure 3:
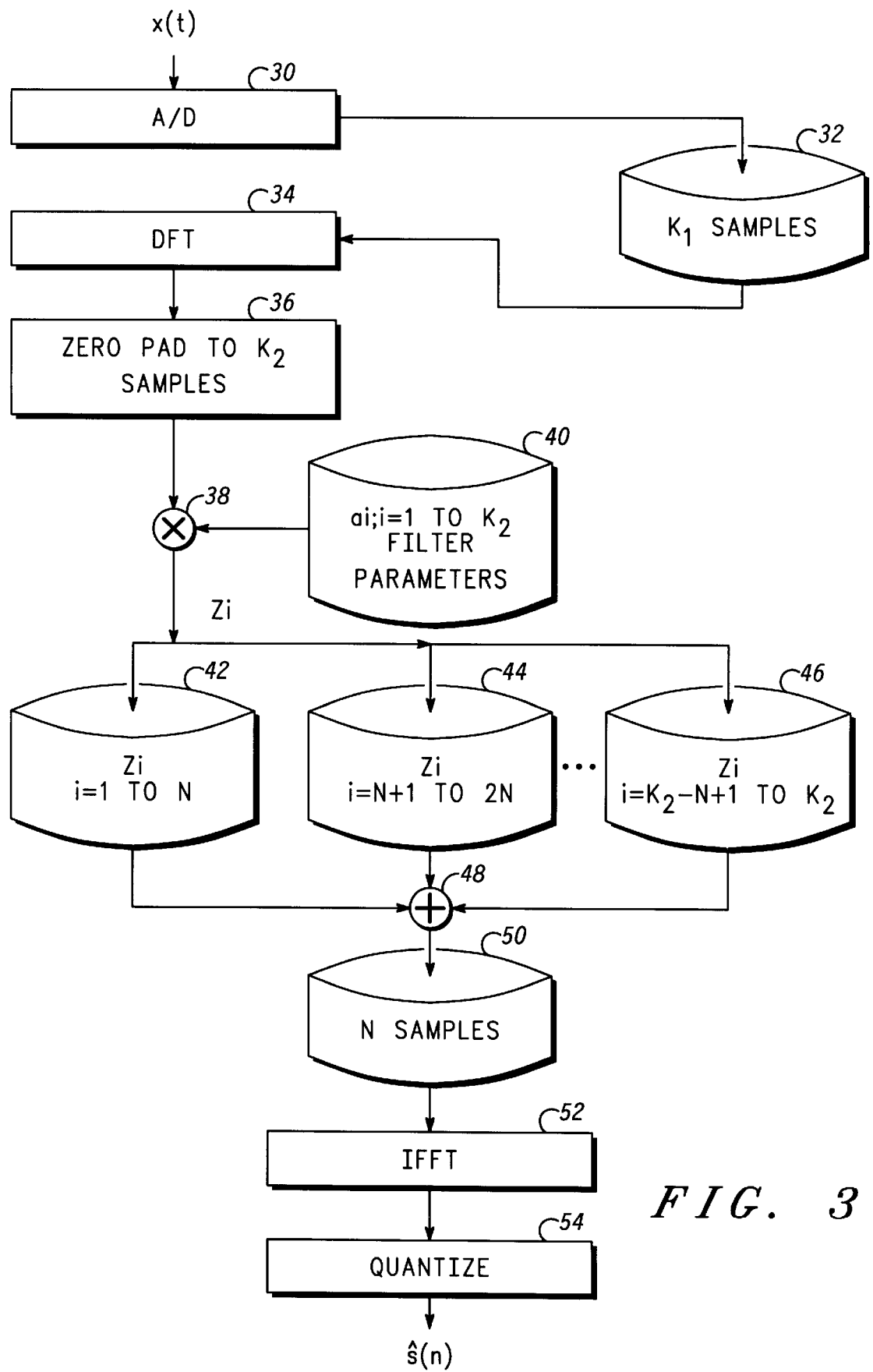
FIG. 3 is a flow diagram illustrating a method of recovering a finite duration of N symbols of a digitally-modulated received radio signal in accordance with the preferred embodiment of the invention.

Referring now to FIG. 3, a flow diagram is shown illustrating the operation of the receiver of FIG. 2 in greater detail. A time-domain batch of $K_1$ pulses x(t) are input to an analog-to-digital converter, as in step 30, to provide $K_1$ time-domain digitised samples as shown in step 32. The digital batch of $K_1$ time-domain samples is input to a DFT 20, as in step 34. The DFT 20 transforms the batch of $K_1$ time-domain digitised samples into the frequency-domain to provide a batch of $K_1$ frequency-domain samples. Zeros are appended to the $K_1$ frequency-domain samples to provide $K_2$ frequency-domain samples if the sampling frequency is not an integer multiple of the symbol period, as in step 36. If the sampling frequency is an integer multiple of the symbol frequency, $K_1=K_2$. The $K_2$ frequency-domain samples are multiplied, in step 38, by a set of $K_2$ complex gains ($a_i$: i=1 to $K_2$) that represent the receiver pulse shape filter response in the frequency-domain, as shown in step 40, to provide a batch of $K_2$ frequency-domain samples. The batch of $K_2$ frequency-domain samples is then broken into $K_2/N$ batches of N samples, as shown in steps 42 to 46, and these batches are added to each other (step 48), to generate a single batch of N samples, as in step 50. The process of adding the $K_2/N$ batches of N samples to each other is equivalent to overlapping the $K_2$ samples to generate a single batch of N samples. The value of N dictates the number of additional samples to be generated between step 44 and step 46 of FIG. 3. The N frequency-domain samples are then input to an IFFT, as in step 52, to transform the single batch of N samples back into the time-domain. The N time-domain samples are then input into a quantizer 26, as in step 54, to obtain the "symbols" output of the received signal $\hat{s}(n)$.

A frequency domain implementation of the symbol recovery is especially suited for TDMA systems as an entire slot is analysed in "batch" processing compared to a time domain implementation where conventional sequential processing is performed. Performing the batch processing in the frequency-domain removes the constraint on the pulse shape to be ISI free. Advantageously the pulse shape can be designed to accommodate other system considerations such as inter-channel interference (ICI). In addition to removing the pulse shape constraint, channel time invariant frequency distortion is removed as the frequency-domain receiver is optimally recovering the symbols from the received pulse shape. The radio frequency (RF) channel and non-symmetric intermediate frequency (IF) filtering are then absorbed trivially into the receiver design. Filtering e.g. to eliminate narrow band disturbances from external or internal sources such as carrier feedthrough, can be applied with little effect on performance and insignificant computational load.

Figure 4:
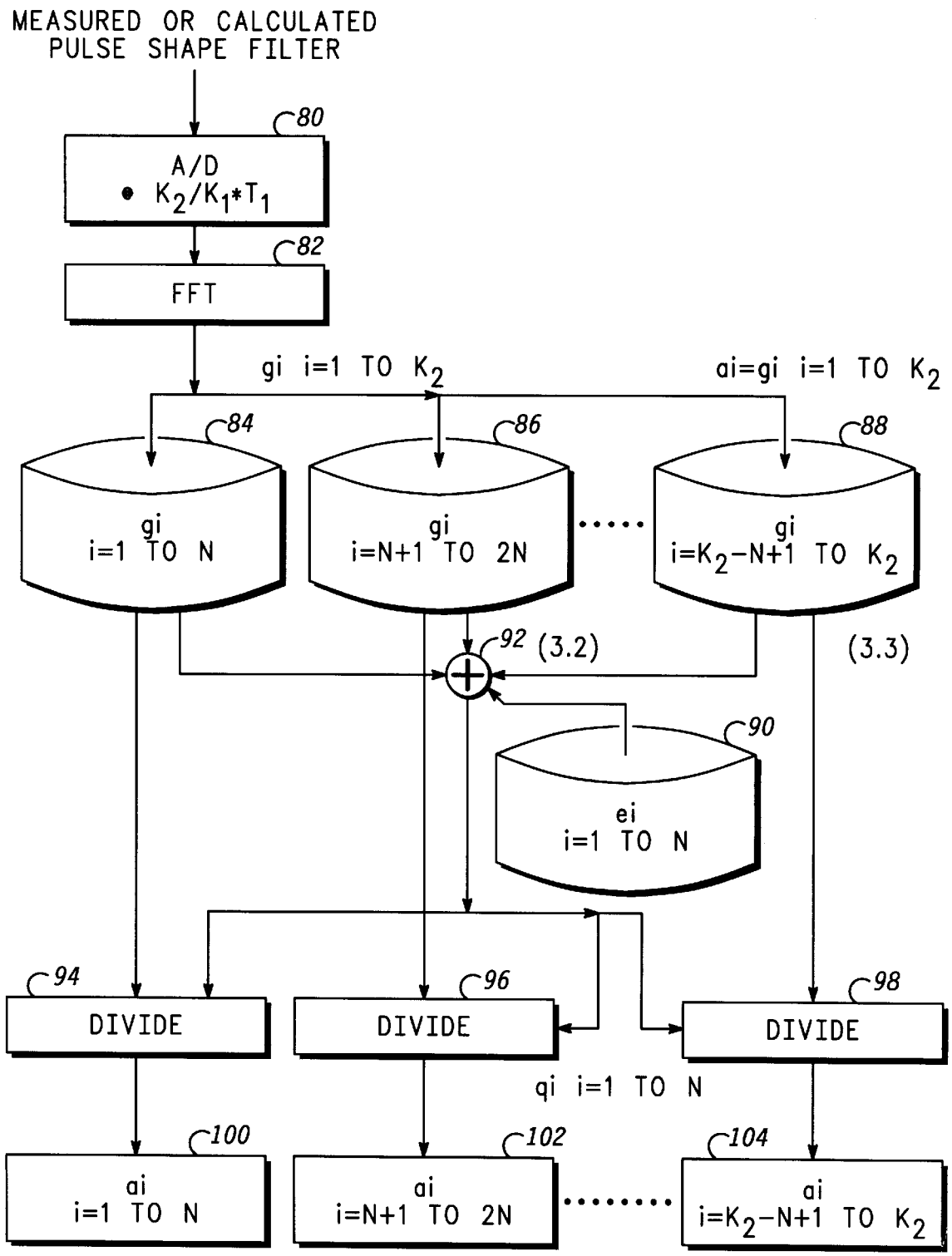
FIG. 4 is a flow diagram for determining the complex gain values $a_i$, from the receiver pulse shape filter response, in accordance with the preferred embodiment of the invention.

Referring now to FIG. 4, a flow diagram for calculating the complex gains $a_i$ from the received pulse shape filter response, for the purposes of step 40 of FIG. 3, is shown. The pulse shape filter response in the time-domain $g_i$ is input into an analog-to-digital converter sampling at a rate of $\{T_1 * K_2/K_1\}$, as shown in step 80. The digitised pulse shape filter response is then transformed into the frequency-domain by a fast fourier transform (FFT), in step 82, to produce the frequency-domain samples of the digitised pulse shape filter $g_i$. The complex gains $g_i$ ($g_i$: i=1 to $K_2$) are then normalised by breaking the batch of $K_2$ complex gains $g_i$ into $K_2/N$ batches of N samples ($g_{ij}$: i=1 to N, j=1 to $K_2/N$), as shown in steps 84 to 88.

The gains $g_{ij}$ are squared and added to each other, as in step 92, and an arbitrary design parameter may be added to them to form the normalising parameters ($q_i$: i=1 to N) given by: $q_i=\text{sum}[|g_{ij}|^2+e_i$: j=1 to $K_2/N$, i=1 to N], as in step 92. The values for $g_{ij}$ are normalised (divided) by the $q_i$ parameters as in steps 94 to 98, to generate the $K_2$ and $a_i$ parameters as shown in steps 100, 102 and 104.

Advantageously, a frequency-domain implementation is optimal for any received pulse i.e. for pulses designed without the Nyquist ISI-free criterion or for pulses undergoing channel linear time-invariant filtering which introduces ISI.

The computational complexity of digital receiver operation is reduced by performing signal processing computations in the frequency-domain. The following method and explanation is given by way of further explanation of the computational simplification achieved.

The method describes the means by which the receiver can be designed and implemented in the frequency-domain using digital signal processing techniques. A frequency-domain implementation is especially suited for the TDMA case since an entire received slot can be analysed in "batch" processing while in conventional (continuous time) sequential processing is called for.

A major advantage of the methodology is that it can provide optimal solutions with no extra complexity to arbitrary received signal shape. As such it circumvents the fundamental Nyquist criterion for Inter Symbol Interference (ISI) free pulse shape (J. G. Proakis, Digital Communication, McGraw Hill). In the time-domain an equivalent receiver requires equalization in the form of a (infinite-optimal or finite-sub-optimal) tap delay filter which entails heavy computational load.

The implications of removing the Nyquist constraints are:
(1) the pulse shape can be designed to accommodate other system considerations such as inter-channel interference (ICI),
(2) the channel time invariant frequency distortion can be accommodated by recovering the symbols from the received pulse shape, absorbing the RF channel and IF filtering trivially into the receiver, and
(3) filtering (e.g. to remove carrier-feedthrough) can be applied with little effect on performance and insignificant computational load.

In the present method an alternative solution to equation [2] is presented. An apparatus is introduced in the frequency-domain which recovers the symbols from the received signal where no special means (i.e. equalization) to overcome ISI is needed—it is inherent in the receiver structure. The basic equations derived below have their equivalent in the time-domain. However, for TDMA signals, analysis of an entire received slot using digital signal processing techniques enables the implementation of the receiver in the frequency-domain.

The mathematical expressions associated with the method are now presented, by way of completeness.

The method describes the application of a discrete fourier transform of the received signal and the efficient estimation of the symbols $\{s(n):=0 \ldots N-1\}$ from the transformed signal.

Applying a discrete fourier transform (DFT) to the received signal of equation [1], we obtain $$x(\omega) = g(\omega) \sum_{n=0}^{N-1} s(n)\exp(-jwT \cdot n)$$

$$\omega \in \Omega_k = \{\omega_k \cdot k = 2\pi k / K \text{ where}: k = 0 \ldots K-1\} = g(\omega)\vec{w}_N(\omega T)^T \vec{s} \quad [3]$$

where $$\vec{w}_N(\omega T)^T = \exp\{[-j\omega T \cdot n : n = 0 \ldots (N-1)]\} \quad [4]$$

$$\vec{s} = [s(0), s(1) \ldots s(N-1)]$$

where
  $\omega$ represents frequency, bold letters are used for variables in the frequency-domain, vectors are arrowed variables (e.g. $\vec{s}$), and the notation operator {vector} implies the operation on each element of the vector. Furthermore, shorthand for vectors are used, as in equation [4].
Rewriting equation [3] in matrix form (matrices are in capital letters)

$$\vec{x} = G \cdot W \cdot \vec{s}$$

where $$\vec{x} = [x(\omega_k \cdot 0), x(\omega_k \cdot 1), \ldots x(\omega_k \cdot (K-1))]^T$$

$$G = diag[g(\omega_k \cdot 0), g(\omega_k \cdot 1), g(\omega_k \cdot (K-1))] \quad [5]$$

$$W = [\vec{w}_N(\omega_k \cdot 0), \vec{w}_N(\omega_k \cdot 1), \ldots \vec{w}_N(\omega_k \cdot (K-1))]^T$$

where diag. [ ] is the diagonal matrix of the entries in the bracket. Ignoring Q[ ] to the symbol Alpha-Bet, the unconstrained optimal estimator (Least Squares and Maximum Likelihood estimator assuming white Gaussian noise) is:

$$\hat{\vec{s}} = |G \cdot W \cdot I^{31 \; 1} \vec{x} \quad [6]$$

where $A^{-1}$ is the generalised (pseudo) inverse of A.

For equation [5] to be meaningful we have K >=2N, i.e. the number of points in the fourier transform of x(t) is greater than twice the number of symbols to be estimated. Although this is not a must, it follows naturally from the dimension of x(t) which must obey the Nyquist sampling rate. Thus equation [6] seemingly entails the inverse of a K by N matrix, a formidable task for a practical DSP based receiver.

Assuming the received pulse shape is known, a computationally efficient solution of equation [6], utilising a FFT and an IFFT as a consequence of some (non-trivial) mathematical manipulations, is provided. An aspect of the invention is the implementation of a computationally efficient solution of equation [6].

If T is an integer, namely the sampling rate is a whole multiplicative factor of the symbol rate and choosing K=NT in the DFT gives:

$$W = [W_N(1), W_N(2) \ldots W_N(T)]^T$$

$$W_N(1) = W_N(2) = \ldots W_N = [\vec{w}_N(\omega_N \cdot 0), \vec{w}_N(\omega_N \cdot 1), \ldots \vec{w}_N(\omega_N \cdot (N-1))] \quad [7]$$

Assuming K=NT is not a restriction, K should be chosen to be larger than NT so as not to truncate the first and last symbols' pulse shape. This is equivalent to augmenting the symbol vector by zero symbols on both frame sides.

Applying the definition of the Generalised inverse to equation [6] and noting that G is diagonal and that W is orthonormal we get:

$$(GW)^{-1}\vec{x} = (W^H G^H G W)^{-1} W^H G^H \vec{x}$$

$$\stackrel{1}{=} \left( \sum_{i=1}^{T} W_N^H G_i^H G_i W_N \right)^{-1} \sum_{i=1}^{T} W_N^H G_i^H \vec{x}_i$$

$$\stackrel{2}{=} (W_N)^{-1} \left( \sum_{i=1}^{T} G_i^H G_i \right)^{-1} (W_N^H)^{-1} W_N^H \sum_{i=1}^{T} G_i^H \vec{x}_i$$

$$\stackrel{3}{=} N \cdot (W_N)^{-1} \left( \sum_{i=1}^{T} G_i^H G_i \right)^{-1} \sum_{i=1}^{T} G_i^H \vec{x}_i$$

$$\stackrel{4}{=} N \cdot IFFT \left\{ \left( \sum_{i=1}^{T} G_i^H G_i \right)^{-1} \sum_{i=1}^{T} G_i^H \vec{x}_i \right\}$$

where the sub-equations [enumerated] are explained as follows:
 sub-equation 0: definition.
 sub-equation 1: substitute equation [7] after breaking the matrices and vectors per the definition in equation [8].
 sub-equation 2: obvious
 sub-equation 3: use orthogonal property
 sub-equation 4: definition.

$$\hat{\vec{s}} = 1/N \cdot IFFT \left\{ \left( \sum_{i=1}^{T} |G_i|^2 \right)^{-1} \cdot \left( \sum_{i=1}^{T} G_i^H \cdot \vec{x}_i \right) \right\} \quad [8]$$

where $\vec{x}_i$ = i-th N dimensional sub vector of $\vec{x}$, $G_i$ = i-th N dimensional diagonal sub matrix of G, and $G^H$ is the hermitian transpose of G Equation [8] is a key equation of the mathematical derivation. It implies that given the DFT of the data and the pulse shape G, estimating the symbols involves first multiplying, $G_H \vec{x}$ (K complex multiplications), secondly, overlapping and summing $$\sum_{i=1}^{T} G_i^H \cdot \vec{x}_i$$

(N*T complex add-multiplications) and thirdly applying a N point IFFT.

It should be noted that
 (i) the external product by $$\left( \sum_{i=1}^{T} |G_i|^2 \right)^{-1}$$

in equation [8] is not considered from a computational view point as it can be absorbed as a normalisation factor into $G^H$;

(ii) for a Nyquist pulse we have $$\left( \sum_{i=1}^{T} |G_i|^2 \right)^{-1}$$

= a constant and thus normalisation is not required (see J. G. Proakis, Digital Communication, McGraw Hill);

(iii) if $$\left( \sum_{i=1}^{T} |G_i|^2 \right)^{-1}$$

is ill conditioned (e.g. has large amplitude variation) the symbol estimates will be noise sensitive. The remedy to this problem is well known and is reflected in the mean square error case, described later;

(iv) the weighted least squares solution rather than least squares solution may be employed to accommodate noise variations across the spectrum, which results in modifying equation [8] to give $$\hat{\vec{s}} = 1/N \cdot IFFT \left\{ \left( \sum_{i=1}^{T} |W_i G_i|^2 \right)^{-1} \cdot \left( \sum_{i=1}^{T} W_i G_i^H \cdot \vec{x}_i \right) \right\}$$

where $W_i$ is a real diagonal weighting matrix.

The extension of the above to the case that T is a rational number is as follows.

Let $$T = Q/R \quad [9]$$

where Q and R are integers. Then, if the signal is interpolated by a factor R the result of the previous section can be applied. However, interpolation by R in the frequency domain is trivially achieved by zero padding the vector $\vec{x}$ by (R−1) K dimensional zero vectors (correctly placed on the unit circle). Applying equation [8] to the padded i is per the previous section. The actual padding is not needed as long as G is expressed in the correct interpolated sampling rate and the overlap-add operation is done in the interpolated domain.

Namely, the zero padding is not performed in practice. Furthermore, note that the DFT of the sampled data is performed prior to the virtual interpolation explained above.

The receiver expressed in equation[8] and its extension for rational sampling rate in the symbol rate T is depicted in FIG. 2.

Using the mean square error criterion, rather than the least squares criterion used above, results in replacing equation [8] by:

$$\hat{\vec{s}} = 1/N \cdot IFFT\left\{ \left( \sum_{i=1}^{T} |G_i + N|^2 \right)^{-1} \cdot \left( \sum_{i=1}^{T} G_i^H \cdot \vec{x}_i \right) \right\} \quad [10]$$

where N is the diagonal matrix of the noise spectral density vector.

The frequency-domain receiver, just as the time-domain receiver is the optimal receiver in the least squares sense, as in equation [8], or mean square error sense, as in equation [10]. Since the time-domain and the frequency-domain representation are related by a linear operator, the performance of the two receivers are identical for ISI-free signals.

A major benefit of the frequency-domain receiver is that it is not restricted to Nyquist pulses. Indeed, the solution in equations [8] and [10] are optimal for any received pulse i.e., for pulses designed without the Nyquist ISI free criterion and for pulses undergoing channel linear time-invariant filtering. On the other hand, ISI effects are usually compensated for in a time-domain receiver by equalization—an expensive and not necessarily optimal (if a finite tap delay approach is used) operation. Moreover, having a complex channel impulse response requires a complex finite impulse response filter for equalization purposes which makes the solution in the time-domain even more expensive computationally.

Thus an improved method of recovering symbols of a digitally modulated radio signal, which avoids some of the disadvantages of prior art arrangements, is provided.

I claim:

1. A method of recovering a finite duration of N symbols of a digitally-modulated received radio signal comprising the steps of:

receiving a signal having a symbol rate;

sampling the signal at a sampling period $T_1$ to generate a first batch of $K_1$ time-domain samples, wherein $1/T_1$ is an integer multiple of the symbol frequency of the received signal and $K_1$ is chosen to be a multiple of N;

transforming the first batch of $K_1$ time-domain samples to a frequency-domain thereby providing a first batch of $K_1$ frequency-domain samples;

multiplying the first batch of $K_1$ frequency-domain samples by a set of frequency-domain $K_1$ complex gains ($a_i$: i=1 to $K_1$), to provide a second batch of $K_1$ frequency-domain samples;

breaking the second batch of $K_1$ frequency-domain samples into $K_1/N$, batches of N samples;

adding the $K_1/N$ batches of N samples to each other to generate a single batch of N samples; and inverse transforming the single batch of N samples into a time-domain to obtain N samples (of desired symbols).

2. A method according to claim 1, wherein the $K_1$ complex gains ($a_i$: i=1 to $K_1$), are calculated by evaluating a received pulse shape filter response in the frequency-domain to obtain a batch of $K_1$ complex frequency-domain samples ($g_i$: i=1 to $K_1$), wherein the parameters $g_i$ represent a frequency-domain pulse shape filter response.

3. A method according to claim 2 wherein the parameters $g_i$ representing the frequency-domain pulse shape filter response are prestored.

4. A method of recovering a finite duration of N symbols of a digitally-modulated received radio signal comprising the steps of:

receiving a signal having a symbol rate;

sampling the signal at a sampling period $T_1$ to generate a batch of $K_1$ time-domain samples, wherein $1/T_1$ is not an integer multiple of a symbol frequency of the received signal;

transforming the batch of $K_1$ time-domain samples to a frequency-domain thereby providing a batch of $K_1$ frequency-domain samples;

appending zeros to the batch of $K_1$ frequency-domain samples, thereby providing a batch of $K_2$ samples in the frequency-domain (wherein $K_2 > K_1$), such that $K_2 = (T_2 \cdot N)$ samples, wherein $1/T_2$ is an integer multiple of the symbol frequency; and multiplying the batch of $K_2$ frequency-domain samples by a set of frequency-domain $K_2$ complex gains ($a_i$: i=1 to $K_2$), to provide a batch of $K_2$ frequency-domain samples.

5. A method according to claim 4, wherein the $K_2$ complex gains ($a_i$: i=1 to $K_2$), are calculated by evaluating a received pulse shape filter response in the frequency-domain to obtain the batch of $K_2$ complex frequency-domain samples ($g_i$: i=1 to $K_2$), wherein the parameters $g_i$ represent a frequency-domain pulse shape filter response.

6. A method according to claim 4 wherein the complex gains $g_i$ ($g_i$: i=1 to $K_2$) are normalised, the method further comprising the steps of:

breaking the batch of $K_2$ complex gains $g_i$ into $K_2/N$ batches of N samples ($g_{ij}$: i=1 to N, j=1 to $K_2/N$);

adding absolute squares of the $K_2/N$ batches to each other to generate a single batch of N normalising values ($q_i$: i=1 to N) such that $q_i = \text{sum}[|g_{ij}|^2: j=1 \text{ to } K_2/N]$;

normalising ($g_{ij}$: i=1 to N) for each j by dividing the values $g_{ij}$ by the values $q_i$ to obtain a new set of gains ($a_{ij} = a_{ij}/q_i$: i=1 to N, j=1 to $K_2/N$);

combining the $K_2/N$ subgroups ($a_{ij}$) back into a single group ($a_i$) to be used as the complex gains of $a_i$ in claim 1.

7. A method according to claim 6 wherein to each $q_i$ there is added a constant $e_i$ as a design parameter.

* * * * *